United States Patent
Wu et al.

(10) Patent No.: US 12,051,274 B2
(45) Date of Patent: Jul. 30, 2024

(54) SYSTEM AND METHOD FOR ASSESSING OPERATOR SITUATIONAL AWARENESS VIA CONTEXT-AWARE GAZE DETECTION

(71) Applicant: Rockwell Collins, Inc., Cedar Rapids, IA (US)

(72) Inventors: Peggy Wu, Ellicott City, MD (US); Ahmad F. Osman, Wethersfield, CT (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/518,363

(22) Filed: Nov. 3, 2021

(65) Prior Publication Data

US 2023/0043771 A1 Feb. 9, 2023

Related U.S. Application Data

(63) Continuation-in-part of application No. 17/481,959, filed on Sep. 22, 2021.

(Continued)

(51) Int. Cl.
*G06V 40/20* (2022.01)
*B64D 43/00* (2006.01)
(Continued)

(52) U.S. Cl.
CPC ............. *G06V 40/20* (2022.01); *B64D 43/00* (2013.01); *B64D 45/00* (2013.01); *B64D 47/08* (2013.01);
(Continued)

(58) Field of Classification Search
CPC ........ G06V 40/20; G06V 40/19; G06V 10/94; G06V 20/597; G06V 40/18; B64D 43/00;
(Continued)

(56) References Cited

U.S. PATENT DOCUMENTS 6,237,496 B1 * 5/2001 Abbott .................... F42B 10/64
244/3.14
6,323,884 B1 * 11/2001 Bird .................... G06F 3/04812
715/810

(Continued)

FOREIGN PATENT DOCUMENTS

| EP | 2304527 A4 | 3/2013 |
| EP | 2916309 A1 | 9/2015 |
| EP | 3454175 A1 | 3/2019 |

OTHER PUBLICATIONS

Endsley, Mica R., "Situation Awareness Misconceptions and Misunderstandings", Journal of Cognitive Engineering and Decision Making, Mar. 2015, vol. 9, No. 1, pp. 4-32.

(Continued)

*Primary Examiner* — Mihir K Rayan
(74) *Attorney, Agent, or Firm* — Suiter Swantz IP

(57) ABSTRACT

A system and method for continuous real-time assessment of the situational awareness of an aircraft operator incorporates gaze sensors to determine the current gaze target (or sequence of gaze targets) of the operator, e.g., which interfaces the operator is looking at. The system receives operational context from aircraft systems indicative of current events and conditions both internal and external to the aircraft (e.g., operational status, mission or flight plan objectives, weather conditions). Based on the determined gaze targets and coterminous operational context, the system evaluates the situational awareness of the operator relative to the operational context, e.g., perceptive of the operational context; comprehending the operational context and its implications, and projecting the operator's perception and comprehension into responsive action and second-order ramifications according to task models indicative of expected behavior.

9 Claims, 5 Drawing Sheets

Related U.S. Application Data

(60) Provisional application No. 63/230,315, filed on Aug. 6, 2021, provisional application No. 63/229,806, filed on Aug. 5, 2021.

(51) Int. Cl.
  *B64D 45/00* (2006.01)
  *B64D 47/08* (2006.01)
  *G06F 3/01* (2006.01)
  *G06F 18/22* (2023.01)
  *G06V 40/19* (2022.01)

(52) U.S. Cl.
  CPC .............. *G06F 3/013* (2013.01); *G06F 18/22* (2023.01); *G06V 40/19* (2022.01)

(58) Field of Classification Search
  CPC ......... B64D 45/00; B64D 47/08; G06F 3/013; G06F 18/22; G06K 9/6201; G09B 19/165
  See application file for complete search history.

(56) References Cited

U.S. PATENT DOCUMENTS

| | | | |
|---|---|---|---|
| 9,547,798 B2 | 1/2017 | Plummer et al. | |
| 9,785,243 B2 | 10/2017 | Kawalkar | |
| 10,216,269 B2 | 2/2019 | Canella et al. | |
| 2009/0234529 A1 | 9/2009 | Diaz et al. | |
| 2009/0303082 A1* | 12/2009 | Larson | G06F 3/0481 340/945 |
| 2011/0111384 A1* | 5/2011 | Dietrich | A61B 5/18 434/350 |
| 2013/0307771 A1 | 11/2013 | Parker et al. | |
| 2014/0320321 A1 | 10/2014 | Loubiere et al. | |
| 2016/0027336 A1* | 1/2016 | Towers | G09B 9/10 434/220 |
| 2016/0357429 A1 | 12/2016 | Nilo et al. | |
| 2017/0212583 A1 | 7/2017 | Krasadakis | |
| 2017/0364068 A1* | 12/2017 | Harada | G05D 1/0044 |
| 2020/0089315 A1 | 3/2020 | Stent | |
| 2020/0142499 A1 | 5/2020 | Katz et al. | |
| 2020/0219320 A1 | 7/2020 | Moniri et al. | |
| 2020/0326822 A1 | 10/2020 | Sultan | |
| 2021/0009140 A1* | 1/2021 | Brooks | G06F 3/011 |
| 2021/0088784 A1 | 3/2021 | Whitmire et al. | |
| 2021/0150390 A1 | 5/2021 | Delgado et al. | |
| 2021/0173480 A1 | 6/2021 | Osterhout et al. | |
| 2021/0182609 A1 | 6/2021 | Arar et al. | |
| 2021/0248399 A1 | 8/2021 | Martin et al. | |
| 2021/0253269 A1 | 8/2021 | Assel et al. | |

OTHER PUBLICATIONS

Peißl, Sylvia et al., "Eye-Tracking Measures in Aviation: A Selective Literature Review", The International Journal of Aerospace Psychology, 2018, vol. 28, Nos. 3-4, 98-112.

Van Eijck, J. et al., "The Effects of Measuring Situation Awareness on Pilot Behavior", 16th International Symposium on Aviation Psychology, 2011, 166-171, URL: https://corescholar.libraries.wright.edu/isap_2011/88.

Babu et al., Estimating Pilots' Cognitive Load From Ocular Parameters Through Simulation and In-Flight Studies. Journal of Eye Movement Resolution. Sep. 2, 2019 (Sep. 2, 2019), pp. 3-1 XP093009344, DOI: 10.16910/jemr.12.3.3 Retrieved from the Internet: URL:https://www.ncbi.mim.nih.gov/pmc/articles/PMC7880144/pdf/jemr-12-03-c.pdf [retrieved on Dec. 19, 2022 *abstract*.

Extended Search Report in European Application No. 22188852.2 dated Jan. 5, 2023, 8 pages.

Extended Search Report in European Application No. 22188883.7 dated Dec. 23, 2022, 7 pages.

\* cited by examiner

SYSTEM AND METHOD FOR ASSESSING OPERATOR SITUATIONAL AWARENESS VIA CONTEXT-AWARE GAZE DETECTION

CROSS-REFERENCE TO RELATED APPLICATIONS

The present application is related to and claims the benefit of the earliest available effective filing dates from the following listed applications (the "Related Applications") (e.g., claims earliest available priority dates for other than provisional patent applications (e.g., under 35 USC § 120 as a continuation in part) or claims benefits under 35 USC § 119(e) for provisional patent applications, for any and all parent, grandparent, great-grandparent, etc. applications of the Related Applications).

RELATED APPLICATIONS

U.S. patent application Ser. No. 17/481,959 entitled SYSTEM AND METHOD FOR GAZE AND POSE DETECTION TO ANTICIPATE OPERATOR INTENT and filed Sep. 22, 2021;

U.S. Provisional Patent Application Ser. No. 63/229,806 entitled SYSTEM AND METHOD FOR GAZE AND POSE DETECTION TO ANTICIPATE OPERATOR INTENT and filed Aug. 5, 2021; and U.S. Provisional Patent Application Ser. No. 63/230,315 entitled OBJECTIVE GAZE GESTURES TO PREDICT OPERATOR SITUATION AWARENESS and filed Aug. 6, 2021.

Said U.S. patent application Ser. No. 17/481,959, U.S. Provisional Patent Application Ser. No. 63/229,806, and U.S. Provisional Patent Application Ser. No. 63/230,315 are herein incorporated by reference in their entirety.

BACKGROUND

Aircraft operators are increasingly tasked with performing battle management tasks while piloting. For example, battle management tasks may include performance according to various task models defining procedures which aircraft operators should follow in response to an event or sequence of events. Similarly, in a manned-unmanned teaming (MUMT) environment an operator or pilot may be responsible for the control and/or deployment of additional unmanned aircraft systems (UAS) or like unmanned assets while maintaining control of, and executing various mission objectives via, a manned aircraft. As the operator is aboard this manned aircraft, the operator's awareness to multiple dynamic events and/or conditions is critical not only to the fulfillment of mission objectives, but to the safety of the operator (and/or any other crewmembers, passengers, or other personnel aboard the aircraft). Measuring operator workload alone may not assess operator situational awareness with sufficient objectivity or granularity.

SUMMARY

In a first aspect, a system for continuous assessment of the situational awareness of an aircraft operator is disclosed. The system incorporates gaze sensors for identifying a gaze target of the aircraft operator, e.g., a control interface within the cockpit at which the operator is currently looking. A controller cross-references gaze target information with operational context received from aircraft systems and subsystems (e.g., flight management system (FMS)), the operational context corresponding to events and/or conditions both internal and external to the aircraft (e.g., weather conditions, aircraft operational status). Based on what the aircraft operator is currently looking at in light of the current operational context, the controller assesses the situational awareness of the aircraft operator with respect to the current operational context.

In some embodiments, the operational context includes a knowledge base of known events and conditions, including expected operator behavior in response to said events and conditions. An evaluation of operator situational awareness includes a confidence level to which received operational context aligns with known operational context as stored within the knowledge base.

In some embodiments, received operational context is associated with satellite unmanned aircraft systems (UAS) or other unmanned teamed/secondary assets controlled by the operator, and situational awareness is assessed based on operator visual engagement with control interfaces corresponding to the teamed/secondary assets.

In some embodiments, the gaze sensor includes a cockpit mounted camera oriented toward the operator and configured for capturing a video stream or image stream of the operator's eye/s. The controller includes a memory storing position and orientation (pose) information for each control interface (display system, portion thereof, control) relative to the position/orientation of the camera.

In some embodiments, the gaze sensor is incorporated into a heads-up display (HUD) or head-worn display (HWD), e.g., as an eye tracker.

In some embodiments, evaluation of operator situational awareness includes one or more of a determination of: operator perception of an operating condition or event; operator comprehension of the operating condition or event, or operator projection of the operating condition or event according to a known task model.

In some embodiments, evaluating operator situational awareness includes comparing operator situational awareness and/or behavior to expected situational awareness and/or behavior based on a given operating condition or event and, when the operator situational awareness and/or behavior sufficiently deviates from what is expected, alerting the operator.

In a further aspect, a method for assessment of the situational awareness of an aircraft operator is also disclosed. In some embodiments, the method includes determining a gaze target of an aircraft operator, e.g., the specific control interface/s at which the operator is looking. The method includes receiving operational context from an aircraft flight management system (FMS), the operational context associated with operating conditions or events internal or external to the aircraft. The method includes, based on the operational context and the determined gaze target/s, evaluating the situational awareness of the operator with respect to the current operational context.

In some embodiments, the method includes capturing an image stream of the aircraft operator's eye/s via a camera mounted within the cockpit or control space and orientation toward the operator, and determining precise gaze targets by comparing the image stream (portraying the orientation of the operator's eye/s) to the positions and orientations of control interfaces relative to the camera to determine where the gaze is directed.

In some embodiments, the method includes determining gaze targets via an eye tracker incorporated into a heads-up display (HUD) or head-worn display (HWD).

In some embodiments, the method includes evaluating a situational awareness of the aircraft operator relative to current operational context as one or more of: determining operator perception of the operational context; determining operational comprehension of the operational context; and determining operator projection of the operational context (e.g., into future action) according to one or more known task models.

In some embodiments, the method includes comparing the determined situational awareness of the aircraft operator to an expected situational awareness of the operator in response to the current operating conditions or events and, if the determined situational awareness of the operator sufficiently deviates from expected situational awareness or behavior, alerting the operator.

In some embodiments, the method includes comparing received operational context (and/or operating conditions or events indicated thereby) with known operating conditions or events stored to memory, and determining a confidence level to which received operational context aligns with specific known operating conditions or events.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
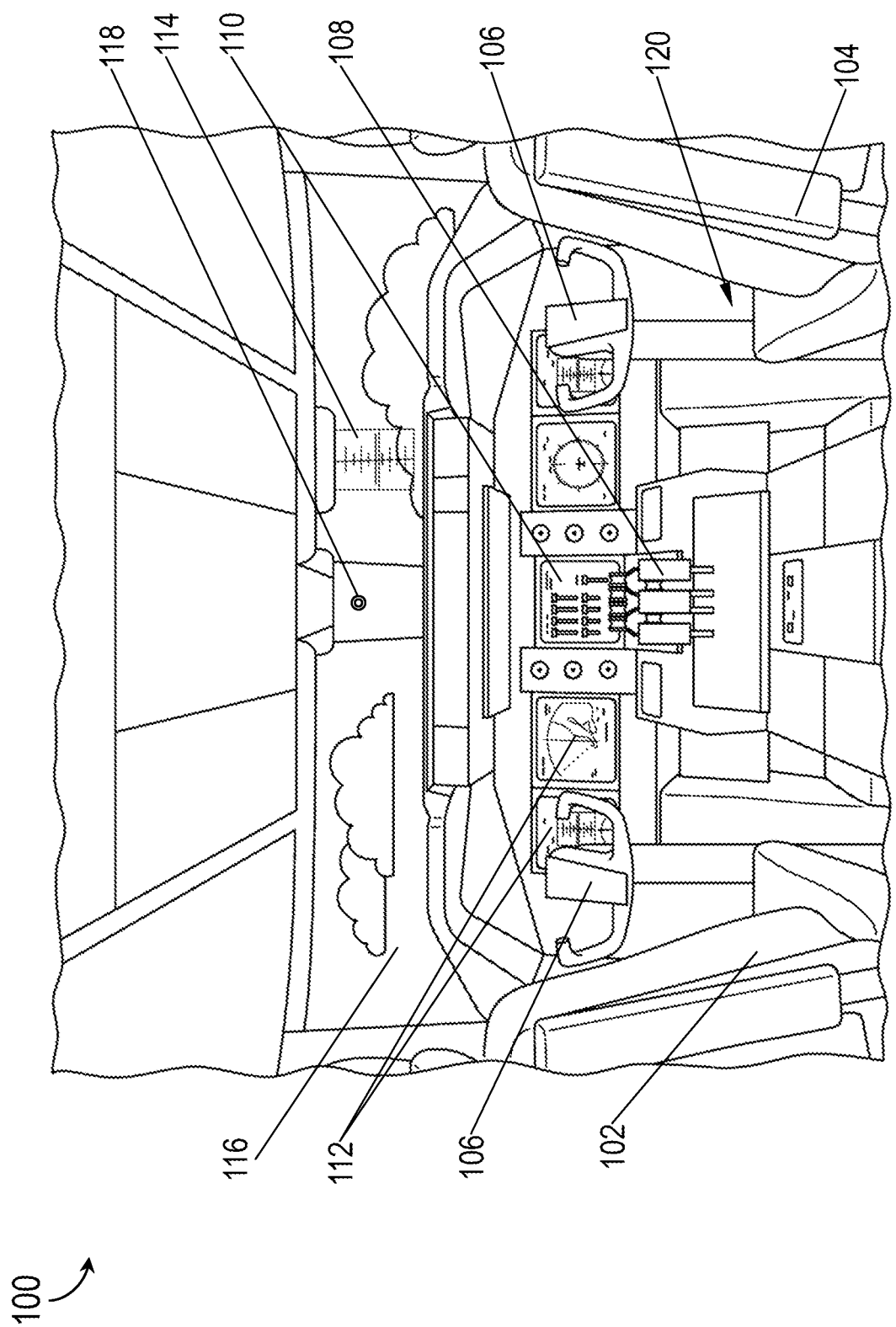
FIG. 1 is an illustration of a control space for an aircraft or other mobile platform according to example embodiments of the inventive concepts disclosed herein.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Broadly speaking, a system and method for continual and granular assessment of the situational awareness of an aircraft operator is disclosed. For example, an operator (e.g., pilot, co-pilot or other cockpit crewmember) may be seated in a cockpit or like control space throughout the duration of a flight, remaining in the cockpit seat through pre-flight checks, taxiing, flight segments (e.g., takeoff, climb, cruise, descent, landing), and taxiing to a final destination before disembarkation, apart from short periods when the operator may not be in control of the aircraft (e.g., when another pilot or operator takes control so the operator may temporarily leave the cockpit). While seated in the cockpit seat, the operator may interact with, activate, or otherwise physically and/or visually engage with various cockpit interfaces. Cockpit interfaces may include, but are not limited to: aircraft controls capable of directly adjusting engine operations, control surfaces, or other flight control systems (e.g., control sticks, throttle controls); display surfaces (e.g., primary flight displays (PFD), navigational displays, enhanced vision/synthetic vision displays (EVS/SVS), heads-up displays (HUD)); windows; communications controls and displays; and mission-specific controls and/or displays (e.g., surveillance equipment, weapons/ordnance). Similarly, cockpit interfaces may include displays and other resources dedicated to unmanned teamed assets under the control of the operator.

The operator may interact with various cockpit interfaces both as needed (e.g., based on flight or mission conditions) or according to patterns. For example, the operator may frequently scan primary flight and navigational displays to refresh situational awareness according to a scan pattern or sequence. Similarly, for a given aircraft configuration, each cockpit interface may be consistently disposed in a fixed position and orientation (pose) relative to the operator and/or the cockpit seat. For example, cockpit interfaces may be disposed directly forward of the pilot, in the pilot's primary field of view (e.g., a HUD) or above eye level.

In embodiments, one or more cameras may be disposed within the cockpit and oriented toward the operator such that any focus of the operator's gaze, or changes in gaze on the part of the operator, may be detected. For example, the system may include a database including a relative pose of each cockpit interface relative to the cockpit seat. When the operator enters the cockpit seat, the cameras may capture a continuous image stream as the operator proceeds from a default state or pose (e.g., not interacting with any cockpit interfaces. not moving, gaze directed straight ahead and x-axis level, calibrated to the height of the operator) through pre-flight checks and active control of the aircraft through various flight segments and/or mission objectives. For example, the image stream may capture each successive visual or physical interaction with cockpit interfaces (e.g., as the operator guides the aircraft through taxi, takeoff, and initial climb, scanning cockpit displays and windows throughout), tracking changes in the operator's gaze as they react to changing events and conditions.

Referring to FIG. 1, a control space 100 is disclosed. The control space 100 may include a pilot seat 102, co-pilot seat 104, control sticks 106, throttle controls 108, communications controls 110, flight displays 112, heads-up display 114 (HUD), windows 116, and gaze sensor 118.

In embodiments, the control space 100 may include an aircraft cockpit or any like space set aside for control of a vehicle or mobile platform by one or more operators (not shown; e.g., a pilot, co-pilot, and/or other crewmember) occupying a dedicated control position (e.g., the pilot seat 102 or co-pilot seat 104). For example, the operator may occupy either the pilot seat or co-pilot seat 104 and, throughout the totality of a flight sequence (e.g., through taxi, takeoff, climb, cruise, descent, landing, and taxi segments of a commercial aircraft) directly maneuver (or otherwise exercise primary control over) the aircraft 100, e.g., via the control stick 106, throttle controls 108, or other physical controls located in the control space and configured for engagement by the operator.

Similarly, the operator may maintain situational awareness throughout the flight sequence based on visual intelligence. In embodiments, the operator may gain awareness as to the current status of the aircraft 100 by viewing the flight displays 112 (e.g., primary flight displays (PFD), navigational displays, instrumentation displays) and/or the HUD 114. Some or all of the flight displays 112 or HUD 114 may be interactive touchscreens allowing the operator to engage with a touch-sensitive display surface and either adjust the information being displayed or exercise control over the aircraft (or one or more components or subsystems thereof).

In embodiments, the flight displays 112 may be implemented using any of a variety of display technologies, including CRT, LCD, organic LED, dot matrix display, and others. The flight displays 112 may be configured to display various types of flight-related and/or mission-related information, such as, but not limited to, manned-unmanned teaming (MUMT) information. An asset may refer to vehicles (manned vehicles and/or unmanned vehicles), such as, but not limited to, aircraft (e.g., manned aircraft and/or unmanned aerial systems (UAS)), spacecraft, ground vehicles, ships, soldiers, military installations, and the like. Likewise, teamed assets may refer to friendly assets. Thus, an unmanned teamed asset may refer to a vehicle (e.g., a satellite UAS) which includes no human crew physically present, which is also a friendly asset. The unmanned teamed asset may include any unmanned aircraft system (UAS) known in the art or any future unmanned aircraft system. The unmanned teamed assets may generally be controlled by a command and control (C2) asset. For example, the command and control (C2) asset may include a display within the control space 100 via which the operator may control the unmanned assets.

Further, in embodiments the operator may enhance situational awareness by looking through the windows 116 (e.g., forward windows, side windows). For example, the operator may use the windows 116 to enhance situational awareness by establishing positive visual identification of underlying terrain and natural or astronomical features (e.g., the position of the sun, moon, or stars), manmade landmarks (e.g., airport facilities, manmade obstacles), and/or proximate air traffic (e.g., manned aircraft reporting a position, unmanned aircraft not otherwise reporting a position).

In embodiments, throughout the flight sequence, from initial to final taxiing, the operator may engage with the control space 100 according to detectable routines or patterns. For example, the operator may be positioned in the pilot seat 102, physically engaging with the control stick 106 and throttle controls 108 via motion of the hand, arm, and/or torso. Similarly, the operator may, from their position in the pilot seat 102, visually engage with focus targets, e.g., physical controls, flight displays 112, HUD 114, and windows 116 by directing their gaze in the direction of each focus target in order to focus their vision and attention thereon.

In embodiments, the operator may additionally engage with electronic flight bags (EFB) or other like mobile devices not physically incorporated into the control space 100 but introduced therein by the operator and connected (e.g., via physical or wireless link) to the flight control system. For example, the operator occupying the pilot seat 102 may provide a tablet or like mobile communications device configured for displaying additional visual intelligence. In embodiments, the mobile device may occupy additional space (120) not already occupied by physical controls, windows 116, or display surfaces (112, 114). For example, the tablet may be attached to the operator's knee (e.g., via a kneeboard), carried in the operator's lap, mounted on a center console, or otherwise occupying a space 120 low in the operator's field of view (relative to the operator).

In embodiments, the flight displays 112 may further be configured to display operational context of various types and formats. For example, an airborne aircraft (e.g., a target) may be detected. The airborne aircraft (e.g., or indicator/s thereof) may be displayed on the flight displays 112. In response to the displayed operational context, the aircraft operator may gaze toward the flight displays 112 (e.g., toward specific portions thereof). A pattern of the gaze may provide a biomarker of the operator. In embodiments, the gaze sensor 118 may capture an image stream of the eye/s of the operator visually engaging with the flight displays 112 and/or other control interfaces throughout the control space 100. The gaze sensor 118 may include any suitable sensor, such as, but not limited to, a camera-based gaze sensor capturing a video stream of one or both eyes of the operator. In embodiments, the captured video stream may then be provided to a controller for analysis as described below.

Figure 2:
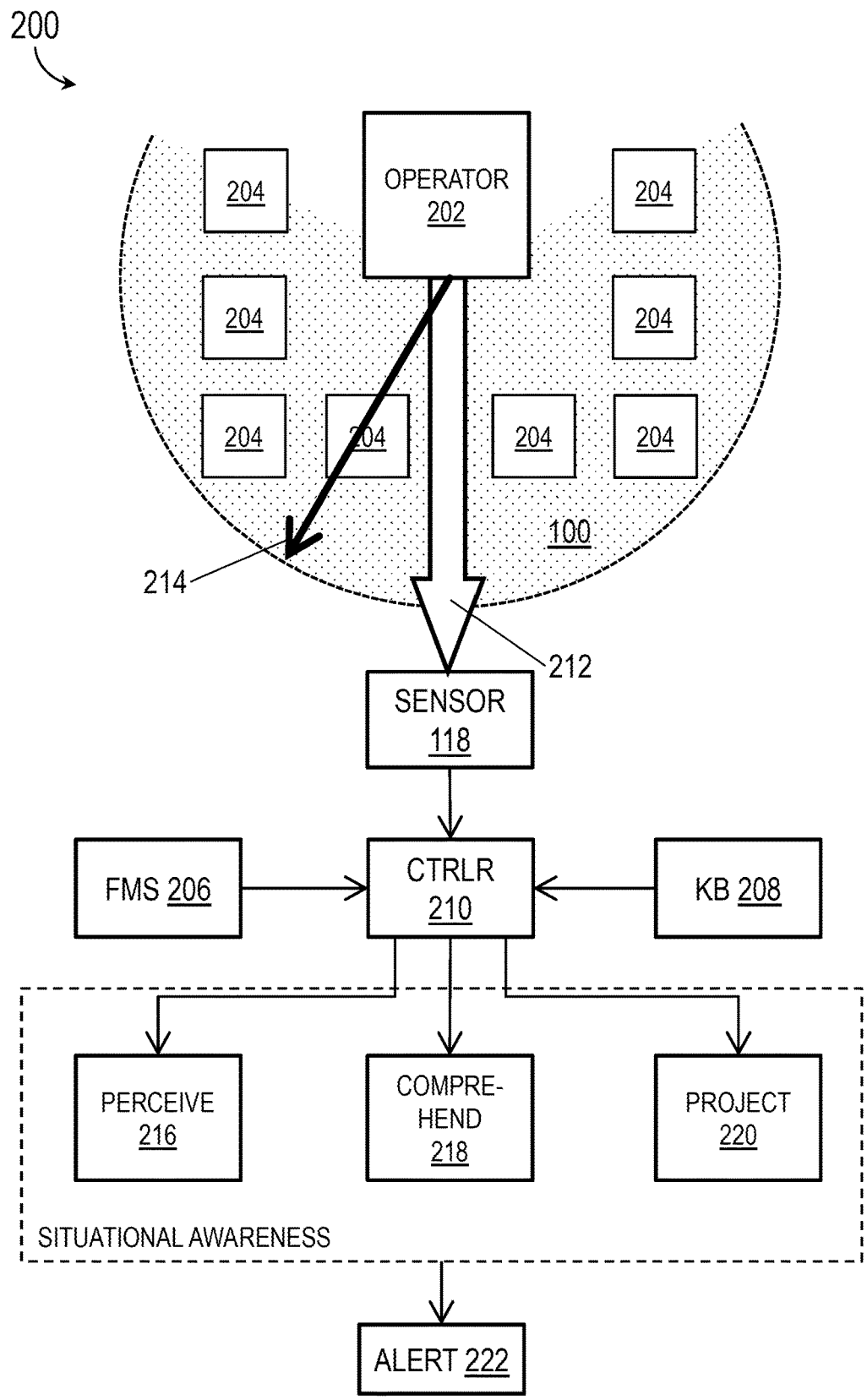
FIG. 2 is a block diagram illustrating a system for assessing situational awareness of an operator within the control space of FIG. 1 according to example embodiments of the inventive concepts disclosed herein.

Referring to FIG. 2, an aircraft 200 is shown. The aircraft 200 may include the control space 100, a control position within the control space for the operator 202 (e.g., pilot, co-pilot), control interfaces 204, flight management system 206 (FMS), knowledge base 208, and controller 210.

In embodiments, control interfaces 204 may include, but are not limited to, control sticks (106, FIG. 1), throttle controls (108, FIG. 1), communications controls (110, FIG. 1), flight displays (112, FIG. 1), HUD (114, FIG. 1), and/or windows (116, FIG. 1).

In embodiments, the controller 210 may receive the image stream (212) from the gaze sensor 118. For example, the eyes of the operator 202 may be associated with a field of view within which the control interfaces 204 are located. In embodiments the knowledge base 208 may provide stored operational context specific to the aircraft 200 (including, but not limited to, e.g., performance envelope, combat capabilities, equipment and ordnance, mission objectives, conditions/scenarios associated with mission objectives), and may include positions and orientations of each control interface 204 (e.g., or segments/portions thereof) relative to the gaze sensor 118.

In embodiments, the image stream 212 may capture a current gaze 214 of the eyes of the operator 202, e.g., a direction or orientation of the eyes, such that the gaze may continually be tracked by the controller 210. Similarly, the controller 210 may receive aircraft operational context from the FMS 206 and/or avionics systems or subsystems (e.g., which systems may be in communication with, and whose output may be forwarded to the controller by, the FMS). For example, received operational context may include real-time or near real-time information including, but not limited to, the detection and/or identification of other aircraft (e.g., manned, unmanned, friendly, hostile, potential or actual threat); changes in atmospheric or weather conditions (e.g., storms, weather patterns, wind patterns); or changes in flight path, flight segment, or operating conditions aboard the aircraft or unmanned teamed assets (e.g., transition from cruise to initial descent, change in heading, deployment of landing gear). In embodiments, the image stream 212 and any received operational contexts may be timestamped or otherwise temporally cross-referenced such that the reaction of the operator 202 to operational context, and the situational awareness of the operator, may be accurately tracked in real time or near real time.

In embodiments, the controller 210 may continually assess a situational awareness of the operator 202 based on received operational context and changes in the operator's gaze 214 as derived from the image stream 212. For example, the controller may analyze the operator's gaze 214 in light of the positions and orientations of each control interface 204 relative to the position of the gaze sensor 118 (for example, the gaze sensor may be a camera mounted in the control space 100 and oriented at the operator 202, and thus fixed in the reference frame of the aircraft 200) and thereby determine the current gaze target of the operator, e.g., which control interface, or portion thereof, the operator is currently looking at.

In embodiments, the controller 210 may assess the situational awareness of the operator 202 with respect to specific operational contexts by determining where (e.g., at which specific control interfaces 204 or portions thereof) the operator is looking in response to that operational context. In particular, the controller may classify the situational awareness of the operator 202 according to three broad levels of situational awareness: perception (216) of the operational context by the operator; comprehension (218) of the operational context by the operator; or projection (220) of the operational context into future events according to one or more task models.

In embodiments, the controller 210 may characterize perception 216 as a simple recognition or acknowledgement by the operator 202 of an event or operating condition based on received operational context. For example, in a military context, the operator 202 may be engaged in piloting the aircraft 200 through a combat area when a proximate aircraft is detected and positively identified as a hostile aircraft. If the operator 202 responds to the detection and identification by looking at a flight display 112 providing position, heading, and identifying information of the hostile aircraft (e.g., shifting gaze 214 to, and holding gaze on, the flight display), the controller 210 may interpret the corresponding gaze as the operator perceiving that the hostile aircraft has been detected.

In embodiments, the controller 210 may characterize comprehension 218 of the operational context as a deeper level of situational awareness reflecting an understanding that not only does a perceived condition exist (e.g., that a proximate aircraft has been detected), but that a response or sequence of responses follow from the perceived condition (e.g., that the aircraft is hostile, and responsive action may be necessary). For example, if the operator 202 is observed by the gaze sensor 118 to first direct their gaze 214 to the flight display 112 as indicated above (e.g., thus perceiving the detection of the aircraft), and then to another control interface 204, the controller 210 may determine that the operator has not only perceived (216) the detected aircraft, but also comprehends (218) first, that the aircraft is proximate and/or hostile, and second, that responsive action should be taken by the operator.

In embodiments, the controller 210 may characterize projection 220 of the operational context as a still deeper level of situational awareness indicative not only of an understanding by the operator 202 that not only does the perceived condition exist and that the condition warrants a response, but also that the operator is executing the correct responsive action in alignment with one or more task models. The operational context stored within knowledge base 208 may include task models (e.g., procedures or sequences of procedures) specific to the aircraft 200, to a particular mission, or to objectives within said mission. For example, rules of engagement associated with a mission assigned to the aircraft 200 may provide that when a hostile aircraft is first detected, the operator 202 should attempt to evade the hostile aircraft, e.g., to prevent or delay detection of the ownship by the hostile aircraft. In embodiments, if the perception (216) of the hostile aircraft by the operator 202 (as observed by the gaze sensor 118 and the controller 210) is followed by a shift in gaze (214) to steering or navigational controls (e.g., control sticks 106, throttle controls 108, control surfaces), the controller 210 may determine that not only does the operator perceive the detected aircraft and comprehend (218) that the aircraft is proximate and/or hostile, but that the operator is taking positive steps to project (220) that comprehension into future action in alignment with task models corresponding to current conditions or events. In embodiments, the FMS 206 may provide additional feedback from avionics systems confirming or contradicting actions taken by the operator 202 (e.g., changes in position, changes in heading, deployment of equipment); the additional feedback may be considered by the controller 210 in assigning weight to a determination of situational awareness of the operator based on the accuracy of the actions inferred by the controller from the detected gaze 214 of the operator.

In some embodiments, the controller 210 may compare received operational context to stored operational context in order to compare the associated conditions or events to conditions or events known to the knowledge base 208. For example, the controller 210 may assign a confidence level to those stored conditions or events most closely matching the received operational context: the higher the confidence level, the more closely received operational context matches a known set of operating conditions or event, and the more likely the controller 210 will assess the situational awareness of the operator 202 in light of task models associated with the known set of operating conditions, considering the associated task models as models of expected behavior in response to the received operational context.

In embodiments, the controller 210 may compare the determined gaze 214 of the operator 202 responsive to received operational context, and operator action inferred from the determined gaze, with expected behavior as modelled by task models associated with known operational context matching the received operational context to a high confidence level. For example, a task model stored within the knowledge base 208 may provide for a particular event or condition (or set/sequence of events or conditions) and one or more responsive actions or sequences of responsive actions indicative of expected behavior in response to the particular event or condition. As noted above, a task model may correspond to detection of a proximate hostile aircraft that may or may not present a current threat (e.g., the hostile aircraft may not have detected the ownship). Adjusting the airspeed or heading of the ownship to evade the hostile aircraft, or maneuver to a more advantageous position relative to the hostile aircraft, may be indicative of expected behavior in response to the detection.

In embodiments, if the determined situational awareness of the operator 202 is sufficiently deviant from expected behavior as to be anomalous, the controller 210 may generate an alert 222 (e.g., log an alert, alert the operator via visual, aural, or haptic alert). For example, if the gaze 214 of the operator in response to the detection of the hostile aircraft (which may not yet pose a positive threat) is interpreted by the controller 210 as looking toward a weapons system display (e.g., rather than intent to evade the hostile aircraft or maneuver the ownship as noted above), this projection of the received operational context may be evaluated as sufficiently anomalous behavior as to warrant an alert.

Figure 3:
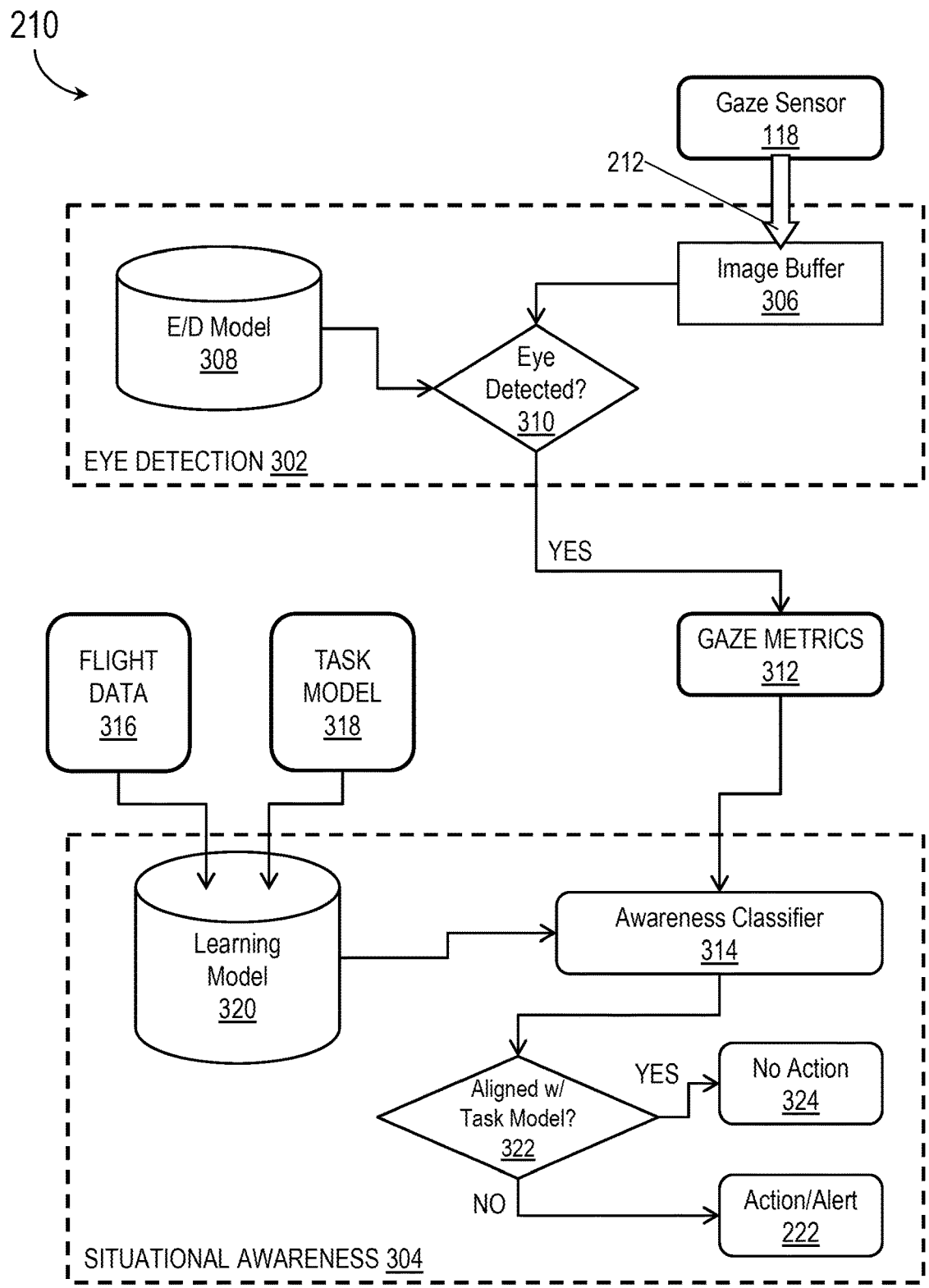
FIG. 3 is a block diagram illustrating operations of the system of FIG. 2.

Referring to FIG. 3, the controller 210 is shown.

In embodiments, operations within the controller 210 include eye detection 302 and evaluation of situational awareness 304. For example, the gaze sensor 118 may generate an image stream 212 of the eyes of the operator (202, FIG. 2). The image stream 212 may be buffered (image buffer 306) and compared to eye detection models 308 to determine (310) whether or not an eye of the operator 202 is found within a particular frame or frame sequence.

In embodiments, if an eye is detected within a frame or sequence of frames from the image stream 212, the image/s may be further analyzed to detect gaze metrics (312). For example, eyelid closure, blink rate, saccadic movements, and other gaze metrics 312 may be indicative of operator fatigue or other workload related conditions, and the controller 210 may consider the presence or absence of gaze metrics in assessing the situational awareness of the operator 202.

In embodiments, the awareness classifier 314 may determine gaze targets (214, FIG. 2) associated with images or image sequences where an eye of the operator 202 is detected. For example, the awareness classifier 314 may determine an orientation of the detected eye/s and cross-reference the detected orientation with the positions and orientations of control interfaces (204, FIG. 2) within the control space (100, FIG. 1) to identify what the operator 202 is looking at in a particular image or throughout an image sequence.

In embodiments, based on the determined gaze 214, the awareness classifier 314 may assess the situational awareness of the operator 202 as indicative of perception (216, FIG. 2), comprehension (218, FIG. 2), or projection (220, FIG. 2) based on real-time flight data 316 (e.g., provided by the FMS (206, FIG. 2)) and task models 318 provided by the knowledge base (208, FIG. 2). For example, the awareness classifier 314 may be trained according to learning models 320 to match events, conditions, or sequences thereof as indicated by flight data 316 (e.g., received operational context) to known events, conditions, or sequences (e.g., stored operational context) and task models 318 associated with the known events, conditions, or sequences. Accordingly, the awareness classifier 314 may determine whether the operator is projecting (220) received operational context according to appropriate task model.

In embodiments, if the awareness classifier 314 assesses the situational awareness of the operator 202 as in alignment (322) with an appropriate task model 318, the associated received operational context, stored operational context, situational awareness assessment, task models, and alignment may be logged and no corrective action taken (324). If, however, the situational awareness of the operator 202 is assessed as anomalous, e.g., beyond a threshold level, an alert 222 may be generated and other corrective action taken.

Figure 4:
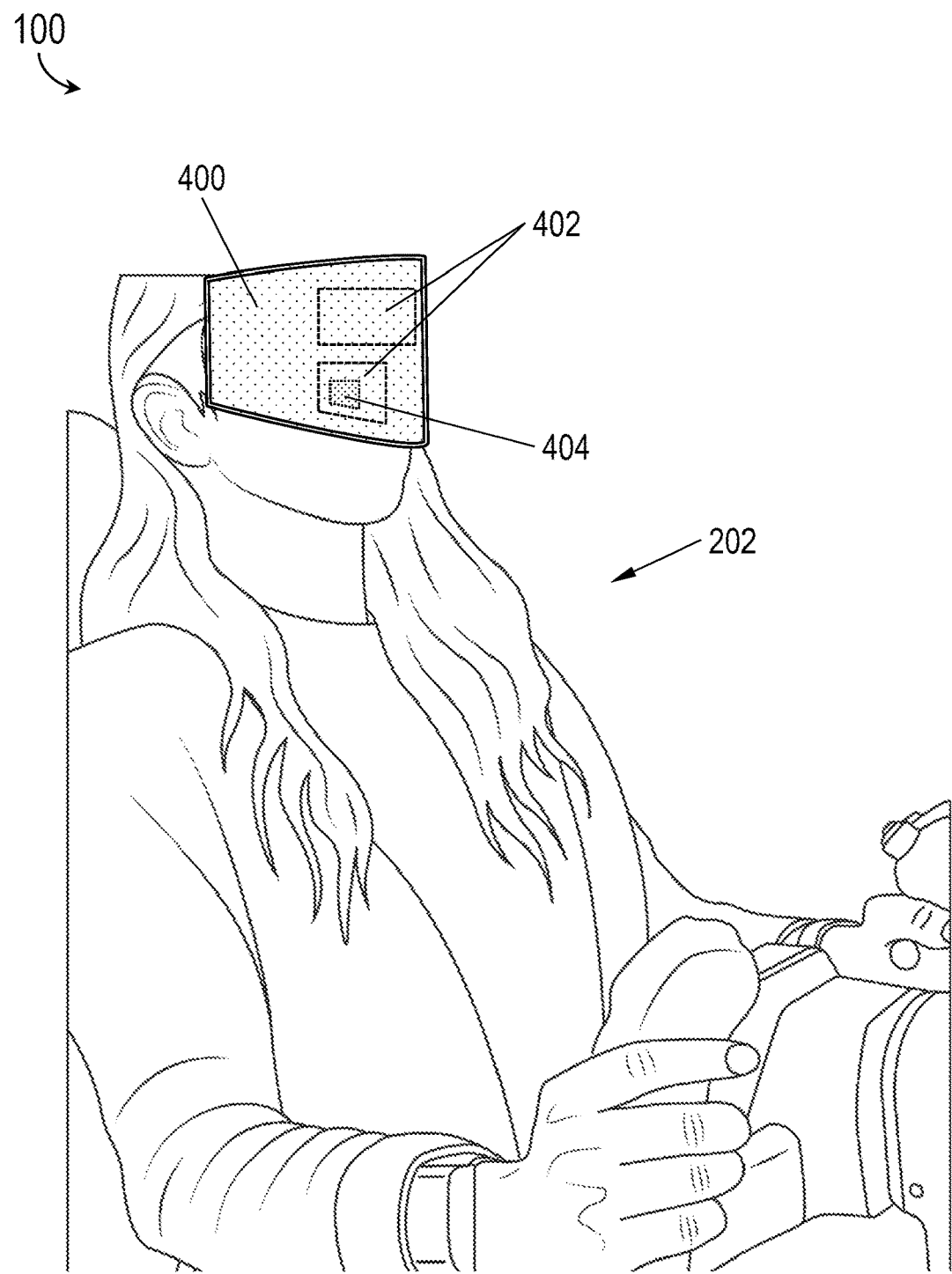
FIG. 4 is an illustration of gaze sensors incorporated into a head-worn display (HWD) of the system of FIG. 2.

Referring now to FIG. 4, the control space 100 is shown.

In embodiments, received operational context may be mapped to multiple display environments. For example, as noted above, the controller may track the gaze (214, FIG. 2) of the operator 202 relative to control interfaces (204, FIG. 2) throughout the control space 100 via a camera (118, FIG. 1) fixed in the control space and oriented toward the operator. In some embodiments, the gaze 214 of the operator 202 may be tracked relative to auxiliary or additional displays. For example, the operator 202 may wear a head-worn display 400 (HWD; helmet-mounted display (HMD)) configured for operational, navigational, or other displays relevant to the operation of the aircraft (200, FIG. 2) and/or successful fulfillment of mission objectives. While the information set displayed by the HWD 400 may be similar to that displayed by the control interfaces 204 (e.g., in that the HWD may display a subset of the information displayed by the flight displays (112, FIG. 1), or both the HWD and the flight displays may display subsets of the same information set), the HWD may display this information differently (e.g., layout, format, presentation) and the operator 202 may interact with the HWD differently than with the control interfaces 204. Accordingly, in embodiments the HWD 400 may include an eye tracker configured for tracking the gaze 214 of the operator 202 relative to regions 402 and subregions 404 of the HWD. For example, the eye tracker may likewise capture an image stream (212, FIG. 2) of the eye/s of the operator 202, the image stream sent to the controller (210, FIG. 2) to determine what regions 402 and/or subregions 404 the operator 202 is looking at and assess the situational awareness of the operator.

Figure 5:
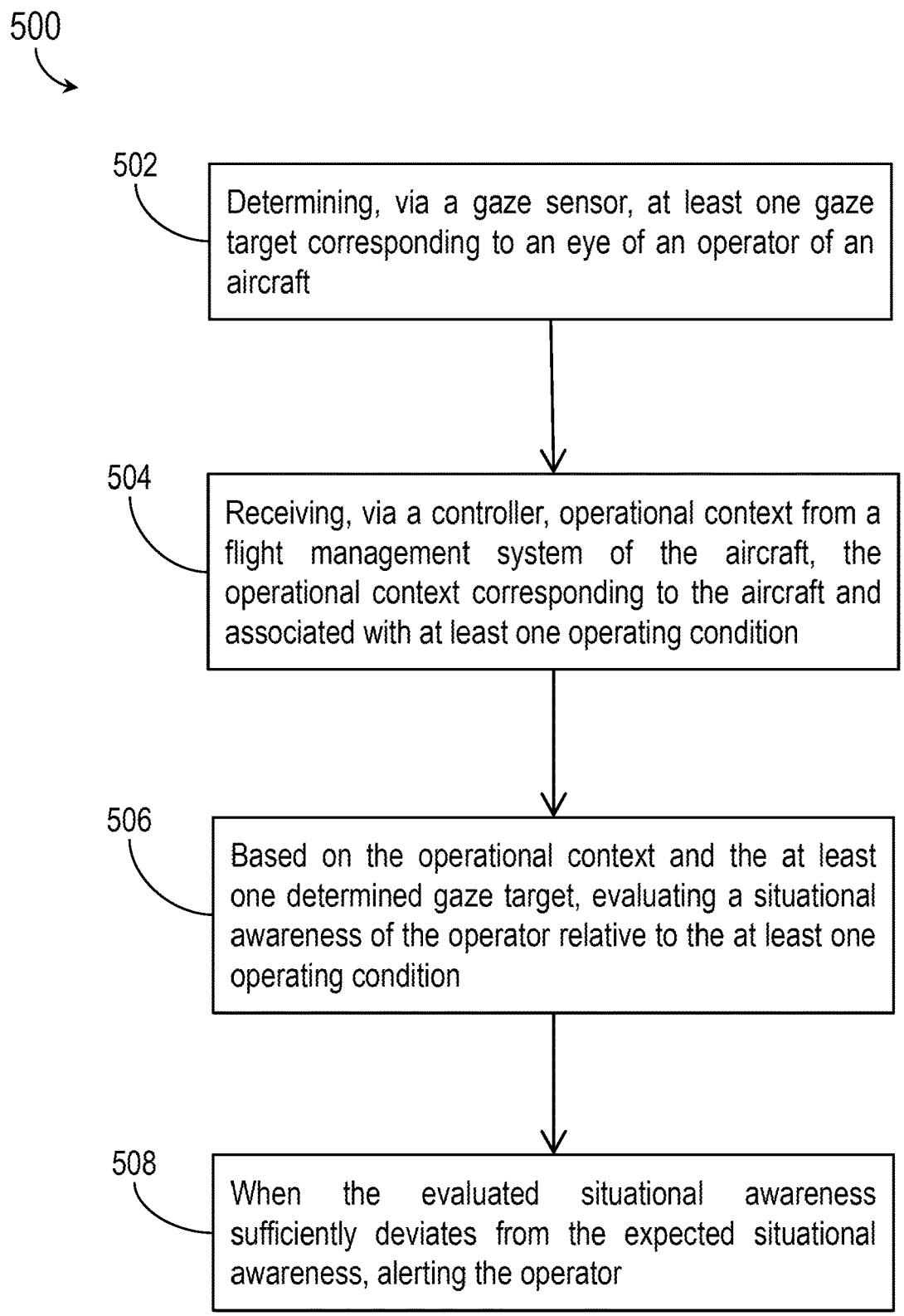
FIG. 5 is a flow diagram illustrating a method for assessment of the situational awareness of an operator of a mobile platform according to example embodiments of this disclosure.

Referring to FIG. 5, the method 500 may be implemented by the system 300 and may include the following steps.

At a step 502, gaze sensors determine gaze targets of one or more eyes of an operator of an aircraft. For example, cameras may track the movement of the operator's eyes relative to control interfaces at fixed locations within the cockpit or control space of the aircraft (or, e.g., relative to a head-worn display that moves with the operator's head) to determine which interfaces (displays, controllers) the operator is looking at from moment to moment, and when the operator shifts their gaze from interface to interface.

At a step 504, a controller of the aircraft receives operational context from avionics systems and subsystems aboard the aircraft, the operational context indicative of events and operating conditions internal or external to the aircraft. For example, received operational context may include real-time or near real-time information related to detection/identification of other aircraft, changes in atmospheric/weather conditions, changes in flight plan or mission objectives, or status reports and equipment deployments for aircraft systems and/or unmanned teamed assets.

At a step 506, based on the received operational context and determined gaze targets, the controller evaluates the situational awareness of the operator relative to current events and conditions. For example, the controller may conclude that the operator perceives the current events or and conditions associated with the received operational context. The controller may conclude that the operator not only perceives the current events and conditions, but comprehends the implications of said events and conditions. The controller may conclude that the operator not only perceives and comprehends the current events and conditions, but projects their perception and comprehension into future responsive action according to task models. For example, the controller may compare received operational context to stored operational context, e.g., a knowledge base of potential events and conditions specific to the aircraft and/or the mission assigned thereto, and determine to a confidence level the alignment of received operational context to stored operational context. In embodiments, the extent to which the operator's situational awareness achieves projection may be compared to the task models associated with the most closely matching stored operational context, and representing expected or model behavior in response to said stored operational context.

In some embodiments, the method 500 may include an additional step 508. At the step 508, if the determined situational awareness or behavior of the operator sufficiently deviates from expected behavior (e.g., as modelled by task models associated with the relevant stored operational context), the controller may alert the operator or take additional corrective action.

CONCLUSION

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A system for assessing situational awareness of an aircraft operator, the system comprising:
   at least one gaze sensor configured to determine at least one gaze target corresponding to an eye of an operator of an aircraft; and
   at least one controller in communication with the gaze sensor, the controller configured to:
   receive operational context from a flight management system of the aircraft, the operational context corresponding to the aircraft and associated with at least one operating condition, wherein the received operational context is associated with a satellite unmanned aircraft systems (UAS) or other unmanned teamed assets controlled by an operator, the operational context includes a knowledge base of one or more known operating conditions associated with the aircraft;
   based on the operational context and the at least one determined gaze target, evaluate a situational awareness of the operator relative to the at least one operating condition, the situational awareness of the operator includes determining a confidence level to which the operational context aligns with the one or more known operating conditions;
   compare the evaluated situational awareness to an expected situational awareness associated with the at least one operating condition; and
   alert the operator when the evaluated situational awareness sufficiently deviates from the expected situational awareness.

2. The system of claim 1, wherein:
   the operational context is associated with one or more secondary assets controlled by the operator;
   and
   the determined situational awareness is associated with engagement by the operator with one or more secondary interfaces corresponding to the one or more secondary assets.

3. The system of claim 1, wherein the at least one gaze sensor includes:
   at least one camera positioned within a control space of the aircraft and oriented to the operator,
   the control space comprising one or more interfaces, and
   the at least one camera configured to capture an image stream corresponding to the at least one eye;
   and
   a memory in communication with the controller, the memory including position and orientation information of each interface relative to the at least one camera.

4. The system of claim 1, wherein the at least one gaze sensor is associated with one or more of a heads-up display (HUD) or a head-worn display (HWD).

5. The system of claim 1, wherein evaluating a situational awareness of the operator includes at least one of:
   determining a perception of the at least one operating condition by the operator;
   determining a comprehension of the at least one operating condition by the operator;
   or
   determining a projection by the operator of the at least one operating condition according to at least one task model.

6. A method for assessing situational awareness of the aircraft operator, the method comprising:
   determining, via a gaze sensor, at least one gaze target corresponding to an eye of an operator of an aircraft;
   receiving, via a controller, operational context from a flight management system of the aircraft, the operational context corresponding to the aircraft and associated with at least one operating condition, wherein the received operational context is associated with a satellite unmanned aircraft systems (UAS) or other unmanned teamed assets controlled by an operator, the operational context includes a knowledge base of one or more known operating conditions associated with the aircraft;
   based on the operational context and the at least one determined gaze target, evaluating a situational awareness of the operator relative to the at least one operating condition, the situational awareness of the operator includes determining a confidence level to which the operational context aligns with the one or more known operating conditions;
   comparing the evaluated situational awareness to an expected situational awareness associated with the at least one operating condition; and
   alerting the operator when the evaluated situational awareness sufficiently deviates from the expected situational awareness.

7. The method of claim 6, wherein determining, via a gaze sensor, at least one gaze target corresponding to an eye of an operator of an aircraft includes:
   capturing, via a camera positioned within a control space of the aircraft and oriented to the operator, the control space comprising one or more interfaces, an image stream corresponding to the at least one eye;
   and
   determining the at least one gaze target by comparing the image stream to position and orientation information of the one or more interfaces relative to the camera.

8. The method of claim 6, wherein determining, via a gaze sensor, at least one gaze target corresponding to an eye of an operator of an aircraft includes:
   determining the at least one gaze target by tracking the eye relative to at least one of a heads-up display (HUD) or a head-worn display (HWD).

9. The method of claim 6, wherein evaluating a situational awareness of the operator relative to the at least one operating condition includes at least one of:
   determining a perception of the at least one operating condition by the operator;
   determining a comprehension of the at least one operating condition by the operator;
   or
   determining a projection by the operator of the at least one operating condition according to at least one task model.

\* \* \* \* \*